United States Patent [19]

Tanaka et al.

[11] Patent Number: 5,386,565
[45] Date of Patent: Jan. 31, 1995

[54] METHOD AND SYSTEM FOR CONTROLLING/MONITORING COMPUTER SYSTEM HAVING PLURAL OPERATING SYSTEMS TO RUN THEREON

[75] Inventors: Shunji Tanaka, Sagamihara; Takayoshi Asai, Yokohama; Taro Inoue, Sagamihara; Hidenori Umeno, Kanagawa; Tsuyoshi Watanabe, Hadano, all of Japan

[73] Assignee: Hitachi, Ltd., Tokyo, Japan

[21] Appl. No.: 640,089

[22] Filed: Jan. 11, 1991

[30] Foreign Application Priority Data

Jan. 23, 1990 [JP] Japan ................... 2-13206

[51] Int. Cl.$^6$ ............ G06F 11/00; G06F 11/30; G06F 11/34
[52] U.S. Cl. ............ 395/700; 395/775; 364/DIG. 1; 364/264; 364/264.5; 364/267; 364/267.91; 364/267.4
[58] Field of Search .......... 364/267, 267.1, 267.2, 364/267.4

[56] References Cited

U.S. PATENT DOCUMENTS

| | | | |
|---|---|---|---|
| 3,707,725 | 12/1972 | Dellheim | 444/1 |
| 4,400,769 | 8/1983 | Kaneda et al. | 364/200 |
| 4,456,954 | 6/1984 | Bullions, III et al. | |
| 4,598,364 | 7/1986 | Gum et al. | 364/300 |

FOREIGN PATENT DOCUMENTS 59-153246  9/1984  Japan .
2-19937   1/1990  Japan .

OTHER PUBLICATIONS

Doran, Robert; *Amdahl Multiple Domain Architecture;* Computer; 1988.

Primary Examiner—Gareth D. Shaw
Assistant Examiner—Jonathan Yo Ting Backenstose
Attorney, Agent, or Firm—Antonelli, Terry, Stout & Kraus

[57] ABSTRACT

An OS control method for controlling an operating system (OS) running in a computer system on which a plurality of OSs run and which includes an instruction processor, a control program for controlling running of a plurality of OSs, a main storage, an external storage device, and an address translation circuit. In the course of processing performed by the instruction processor, predetermined operation of the instruction processor is monitored to output trace data affixed with an address conforming to the running OS in accordance with predetermined conditions for the predetermined operation. Address for the running OS is translated into a real address on the main storage. A debugging assist unit outputs trace data to one of plural storing areas of the main storage corresponding to the running OS at the translated real address. In the state in which the storing area containing the real address on the main storage resulting from transaltion of the address for the running OS is paged out, the trace data for the running OS is outputted to a host trace area.

3 Claims, 9 Drawing Sheets

METHOD AND SYSTEM FOR CONTROLLING/MONITORING COMPUTER SYSTEM HAVING PLURAL OPERATING SYSTEMS TO RUN THEREON

BACKGROUND OF THE INVENTION

The present invention relates to a computer system which includes a debugging assist unit for performing tracing operation for running one of plural operating systems adapted to run on the computer system.

In a virtual machine system, there are realized on a single computer system a plurality of virtual machines (referred to as VM in abbreviation) which are logical computers, wherein in each of the virtual machines or VMs an operating system or OS is allowed to run under the control of a virtual machine control program (hereinafter also referred to as VMCP in abbreviation), as is disclosed, for example, in U.S. Pat. No. 4,456,954. To this end, the virtual machine control program or VMCP assigns distributively resources of the real computer as well as resources logically generated by the VMCP itself to the individual virtual machines or VMs. With regard to a main storage, it is conceivable, for example, to divide a storage space of a physical main storage into a plurality of regions, wherein a plurality of adjacent regions forming a continuous storage area is assigned to a given one of the VMs as a main storage therefor or alternatively a virtual space generated by the VMCP by using a paging area may be assigned to a VM as the main storage. In any case, except for the VM which has consecutive areas starting from the 0-th address of the physical main storage, the address of a main storage on a VM designated as the absolute address by the OS running on the VM generally differs from the absolute address on the corresponding physical main storage.

In the system known heretofore, each of instruction processors is equipped with hardware referred to as the program event recording hardware or PER in abbreviation for issuing an interruption immediately after any one of particular program events designated previously by the OS has occurred, for the purpose of aiding in debugging a program. As the particular program events, there can be mentioned four events which follows:

(i) Event indicating that successful branching has been resulted from execution of a branch instruction resident at an area designated previously by an OS.

(ii) Event indicating that an instruction resident at an area designated previously by an OS has been executed.

(iii) Event indicating that data have been stored at an area designated previously by an OS.

(iv) Event indicating that a general register designated previously by an OS is updated or altered by an instruction resident at an area designated by the OS.

By making use of the program event recording hardware or PER, a program being developed can be debugged with a high efficiency, as described below.

Let's assume that a program developer issues to an OS a request for discontinuing execution of a program under development immediately after execution of an instruction stored in the program at a particular address thereof. In that case, the OS instructs to the program event recording PER that interrupt should occur upon execution of the instruction. This corresponds to the event (ii) mentioned above. Subsequently, in response to the interruption made by the program event recording PER, the OS discontinues the execution of the abovementioned program and informs the program developer of discontinuation of execution of the program by generating a message or other information on a display. In response to this message, the program developer confirms values of registers, field values of tables and others at the time of occurrence of the discontinuation of the program. When the values of register, field values of tables and others are found to be normal as the result of the confirmation, execution of the program is restarted, and operation of the program after the discontinuation is confirmed in succession.

On the other hand, when it is found at the time of discontinuation of execution of the program that abnormal values are stored in the tables of the program under development, then the program is again executed while monitoring the event (iii) mentioned previously. Thus, it is possible to limit the range of a defective portion of the program. Further, when an abnormal value is found to be stored in a general register upon discontinuation of execution of the program, the latter is executed again while monitoring the event (iv) mentioned previously. In this case, the range of defective portion of the program can be limited. Further, by executing again the program while monitoring the event (i), the program developer can know which path within the program executed results in the program defect, whereon he or she is capable of picking out the defective portion on the basis of the knowledge thus obtained.

In JP-A-H2-19937 (corresponding to Japanese Patent Application No. 170071/1988), there is disclosed an arrangement which makes it possible to use the program event recording PER also in a virtual machine system with a high efficiency. In case an operating system running on a VM is to be debugged, it is necessary that the virtual machine control program or VMCP controls the program event recording PER. On the other hand, when a program being developed under an operating system or OS is to be debugged, the OS itself is required to control the program event recording PER. Under the circumstance, the system disclosed in JP-A-H2-19937 is so arranged as to make available the debugging assist function of the program event recording PER selectively either for the VMCP or the running OS.

Further, JP-A-59-153246 discloses a debugging assist system which is so arranged as to store trace information in a physical main storage at a predetermined trace area immediately after occurrence of a particular program event. With this debugging assist system, an OS can recognize at one time a plurality of event occurrences without bringing about interruption. Thus, there can be realized the debugging assist function involving less overhead.

The prior art system disclosed in JP-A-59-153246 mentioned above is certainly advantageous in that a program under development can be debugged without interrupting the OS which is running. However, applicability of this system is limited only to a real computer system. In other words, this prior art system can not be applied, as it is, to a virtual machine system on which a plurality of operating system or OSs can run under the control of the virtual machine control program or VMCP, the reasons for which can be explained as follows.

(a) In the case of a real computer system which includes no virtual machine, the trace information useful for the debugging is directly stored at a trace area designated by an OS with an absolute address or physical address. In this conjunction, it will be noted that in the case of an OS adapted to run on a VM of a virtual machine system, the absolute address of a virtual main storage for the VM designated as the trace area by the OS is a virtual address for the real computer system. Consequently, it is impossible for the debugging assist unit or hardware to store directly or straightforwardly the trace information at the area of which address is designated by the operating system on the virtual machine.

(b) In the case of the real computer system, the trace information is stored at a trace area designated by the operating system or OS with the absolute address, as described above. Accordingly, there can not take place in the real computer system such situation in which the trace area is in the page-out state. In contrast, in the case of the virtual machine system, consideration has also to be paid to such situation where a trace area for an operating system on a given VM has been paged out to an auxiliary storage such as disk unit or the like by the virtual machine control program or VMCP. When an instruction of the OS is paged out by the VMCP in this manner, a page fault will be detected when an instruction processor is about to execute this instruction, as a result of which execution of the instruction is inhibited with the instruction being intercepted to the VMCP. In this case, the VMCP may first page in a page at which the instruction of OS is resident and execute the instruction again. However, in the case where the instruction of OS is in the page-in state while the trace area of the OS is paged out by the VMCP, the instruction which is subject to the monitoring will be executed completely without allowing to trace it. Consequently, even when the VMCP restarts the VM after having paged in the trace area of the OS, execution will be started from an instruction which succeeds to that to be monitored, which in turn means that one set of trace information will be lost.

SUMMARY OF THE INVENTION

It is an object of the present invention to provide a computer system which allows the trace information resulting from tracing performed by a debugging assist unit to be utilized by an OS on a virtual machine (VM) in a virtual machine system.

Another object of the present invention is to provide a computer system in which the tracing can be continued even when a trace area of an OS adapted to store the trace information is paged out by a virtual machine control program (VMCP).

A further object of the present invention is to provide a computer system in which a debugging control word in an instruction processor can be rapidly saved to a state descriptor in a VMCP when it is required as the debugging assist unit traces the instruction processor.

In view of the above and other objects which will be apparent as the description proceeds, there is provided according to an aspect of the present invention, a computer system which includes an instruction processor and a main storage and on which a plurality of operating systems can run, wherein an output means for translating an address of a first trace area on a virtual main storage assigned to a running operating system into a real address of a second trace area provided on the main storage is incorporated in the abovementioned instruction processor, and wherein debugging assist means is provided which monitors occurrence of a program event designated by the running operating system and stores the result of the monitoring at the second trace area designated by the output means when the event occurs in the instruction processor.

In a preferred mode for carrying out the invention, the debugging assist means stores the result of the monitoring at a third trace area assigned to a control program which controls the running of a plurality of operating systems, when the first trace area is paged out, wherein the instruction processor includes means for discontinuing the running of the operating system to intercept the control program which responds thereto by copying the result of the monitoring stored in the third trace area to the first trace area.

When an event previously designated to the debugging assist unit by the running OS takes place in the instruction processor in the state in which the trace area of the running OS is paged in, the address of the trace area (real address of the virtual machine) is translated into a physical address which is then supplied to the debugging assist unit. As a result, the trace information is stored at the trace area designated previously by the running OS.

On the other hand, when the trace area of the running OS is paged out by the virtual machine control program or (VMCP), the physical address of the trace area of the VMCP is supplied to the debugging assist unit as a trace information storing address. As a result, the trace information is stored at a corresponding trace area of the VMCP. In response to the storage of the trace information at the trace area of the VMCP, an information activating means sends a trigger signal to an interception circuit which serves to discontinue operation of the running OS for transferring the control to the VMCP. Thus, the running of the OS is discontinued by the interception circuit, whereon the control is passed to the VMCP, which then copies the trace information stored in the trace area thereof onto a corresponding page of an auxiliary storage (desk unit or the like) on which the trace area of the OS having been discontinued to run exists. In this manner, the trace information is stored at the trace area designated previously by the running OS.

DESCRIPTION OF THE PREFERRED EMBODIMENTS

Now, the present invention will be described in detail in conjunction with exemplary or preferred embodiments thereof by reference to the accompanying drawings.

Figure 1:
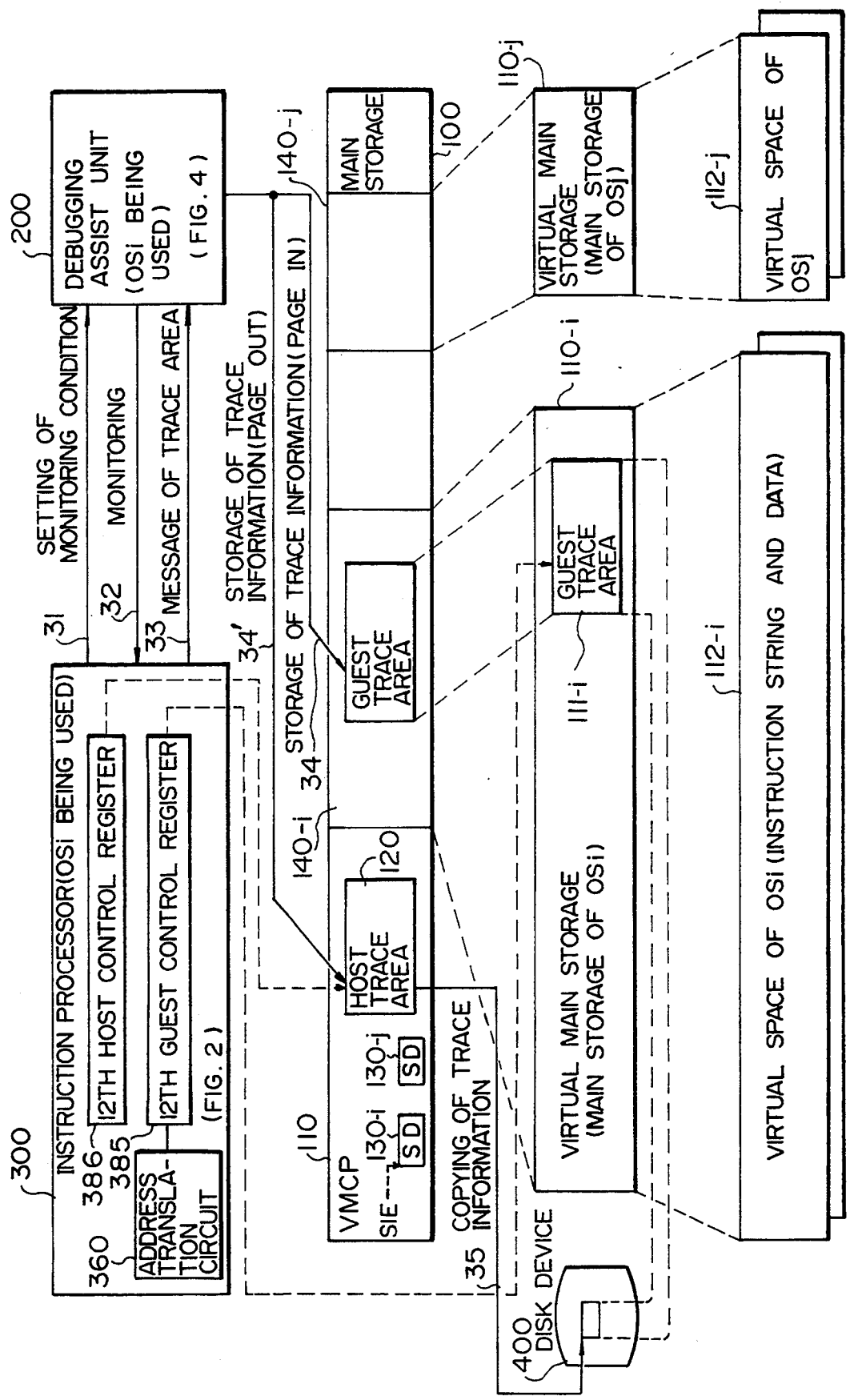
FIG. 1 is a schematic diagram showing a general arrangement of a virtual machine system to which teachings of the present invention are applied.

FIG. 1 shows generally a system arrangement of a virtual machine system to which the present invention is applied. In the figure, a reference numeral 100 denotes a main storage, 200 denotes a debugging assist unit, 300 denotes an instruction processor, and a reference numeral 400 denotes a disk device.

The main storage 100 stores therein a virtual machine control program (also referred to simply as VMCP) which serves for managing all the resources of the whole computer system and at the same time controls operations or runnings of individual virtual machine $VM_i$ (where $1<i<m$). The virtual machine control program or VMCP 110 includes a host trace area 120 for storing trace information supplied from the debugging assist unit 200. Further incorporated in the instruction processor 300 a twelfth host control register 386 which serves to hold a start physical address of the trace area 120 mentioned above. In this conjunction, it should be mentioned that in the case of the instant embodiment, there are provided sixteen control registers in total. Further, the VMCP 110 includes state descriptors (SD in abbreviation) 130-$i$ (where $1<i<m$) which are disclosed in JP-A-57-212680 cited hereinbefore. The state descriptors or SDs 130-$i$ are operands of a start interpretative execution instruction (also referred to as SIE instruction in abbreviation) for activating the virtual machines or VM and serve for holding initial values or others of those registers which are incorporated in the individual virtual machines $VM_i$ (where $1<i<m$).

Virtual main storages 110-$i$ (where $1<i<m$) serve as main storages of the individual virtual machines $VM_i$, respectively, parts or the whole of which are mapped, respectively, onto areas 140-$i$ of the main storage 100. Further, each of the virtual main storages 110-$i$ (where $1<i<m$) includes a guest trace area 111-$i$ (where $1<i<m$) for storing the trace information supplied from the debugging assist unit 200. The guest trace area 111-$i$ ($1<i<m$) may be mapped or paged in the main storage 100 by the VMCP 110 or may be mapped or paged out to external storages such as the disk unit 400 and others. The twelfth guest control register 385 incorporated in the instruction processor 300 serves to hold the start VM real address of the guest trace area 111-$i$. The VM real address mentioned above is a real address on the VM when viewed from the side of OS (and is a virtual address when viewed from the real computer). The start VM real address of the guest trace area 111-$i$ is translated into a physical address by an address translation circuit 360 provided according to the teachings of the present invention, as will be described later on. Further, the operating systems $OS_i$ on the individual virtual machines ($VM_i$) prepare virtual spaces 112-$i$ for holding instruction strings and data, respectively. These virtual spaces can be designated with VM virtual addresses.

Operation of the embodiment of the invention now under consideration is performed as follows.

When the VMCP 110 dispatches a virtual machine $VM_i$ in response to an start interpretative execution (SIE) instruction, the instruction processor 300 and the debugging assist unit 200 are set to the state being used by the operating system running on the virtual machine $VM_i$. Further, conditions for monitoring the instruction processor 300 is set up at the debugging assist unit 200 in accordance with the SIE instruction which is extended according to the teachings of the present invention (as indicated at 31 in FIG. 1). Subsequently, the debugging assist unit 200 monitors or supervises program events occurring in the instruction processor 300 in accordance with the conditions mentioned above (as indicated at 32). When a program event which meets the conditions for the monitoring is detected by the debugging assist unit 200, the instruction processor 300 executes either one of operations mentioned below in dependence on whether or not the guest trace area 111-$i$ is in the page-in state.

(a) In case the guest trace area is in the page-in state:
The instruction processor 300 translates the VM real address of the guest trace area 111-$i$ held by the twelfth guest control register 385 into a physical address with the aid of the address translation circuit 360, which physical address being messaged to the debugging assist unit (as indicated at 33). The latter then stores the trace information incoming from the program event recording PER at the guest trace area 111-$i$ which is indicated by the abovementioned physical address (step 34).

(b) In case the guest trace area is in the page-out state:
The instruction processor 300 messages to the debugging assist unit 200 the physical address of the host trace area 120 held by the twelfth host control register 386 (as indicated at 33 in FIG. 1) The debugging assist unit 200 stores the trace information in the host trace area 120 indicated by the physical address (341). After having stored the trace information, the instruction processor 300 discontinues the run of the virtual machine $VM_i$ to thereby allow the control to be transferred to the virtual machine control program or VMCP 110. Subsequently, the VMCP 110 copies the trace information contained in the host trace area 120 onto a page of the disk unit 400 which corresponds to the guest trace area 111-$i$ (35). In the case of the illustrated embodiment, it is assumed that the guest trace area 110-$i$ is paged out to the disk unit 400. It should however be understood that this area 110-$i$ may be paged out to other auxiliary storage unit (extended storage or other).

In this manner, the OS on the VM can make use of the trace function performed by the debugging assist unit 200. Besides, even when such situation occurs in which the page of the OS which is to store the trace information is paged out by the VMCP 110, the tracing can be continued.

Figure 2:
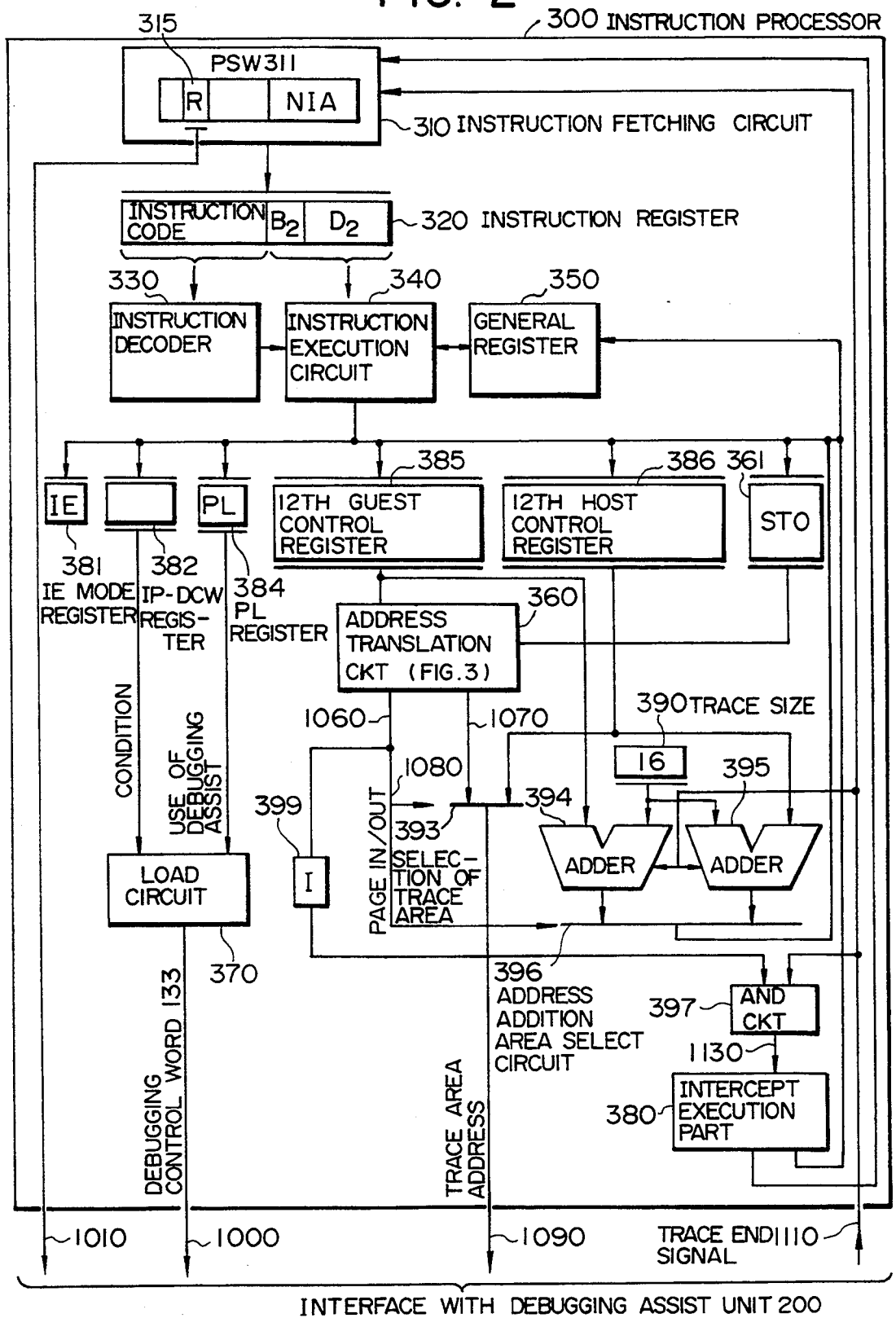
FIG. 2 is a block diagram showing a structure of an instruction processor to which the present invention is applied.
Figure 3:
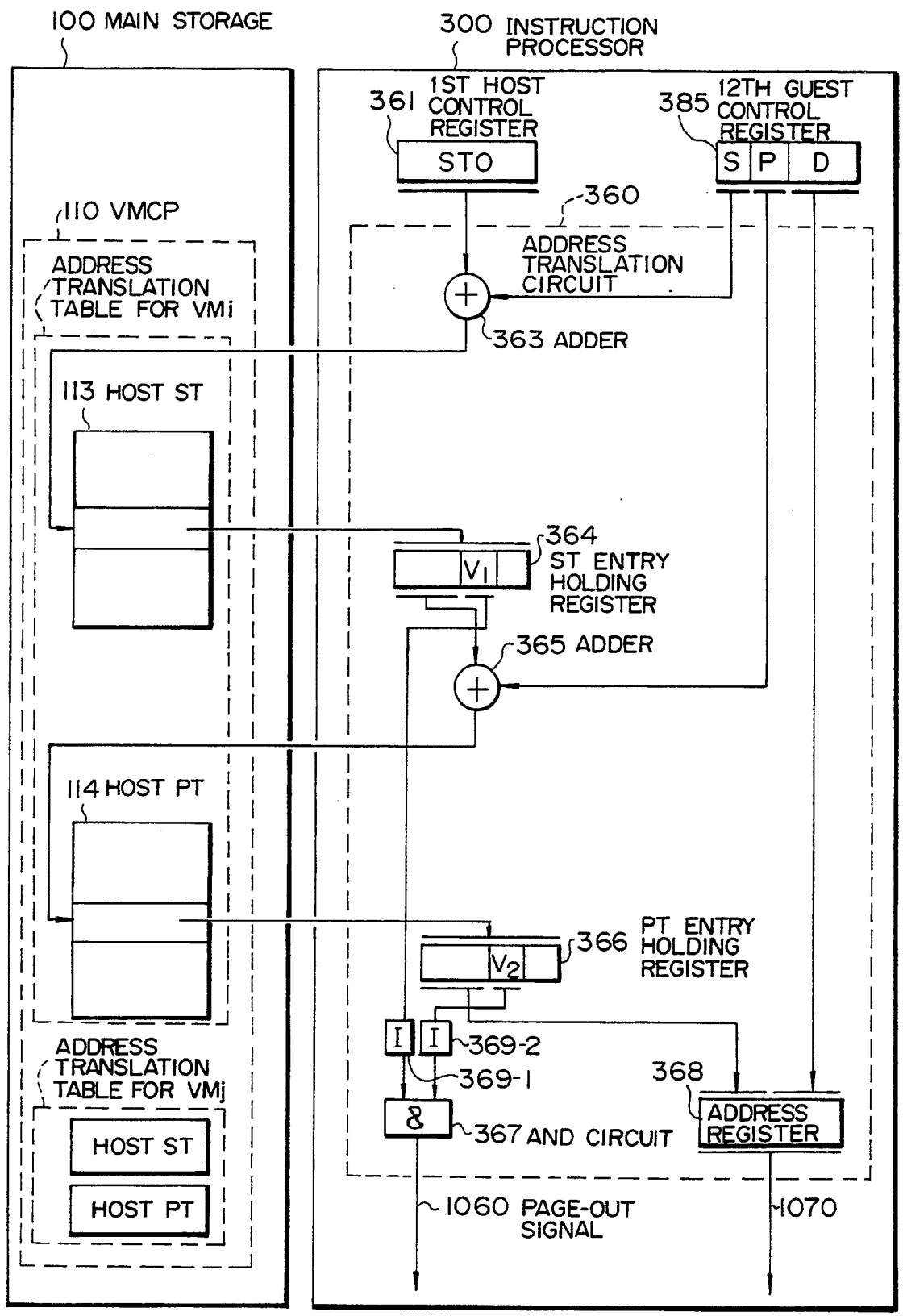
FIG. 3 is a diagram showing an address translation circuit according to an embodiment of the invention.
Figure 4:
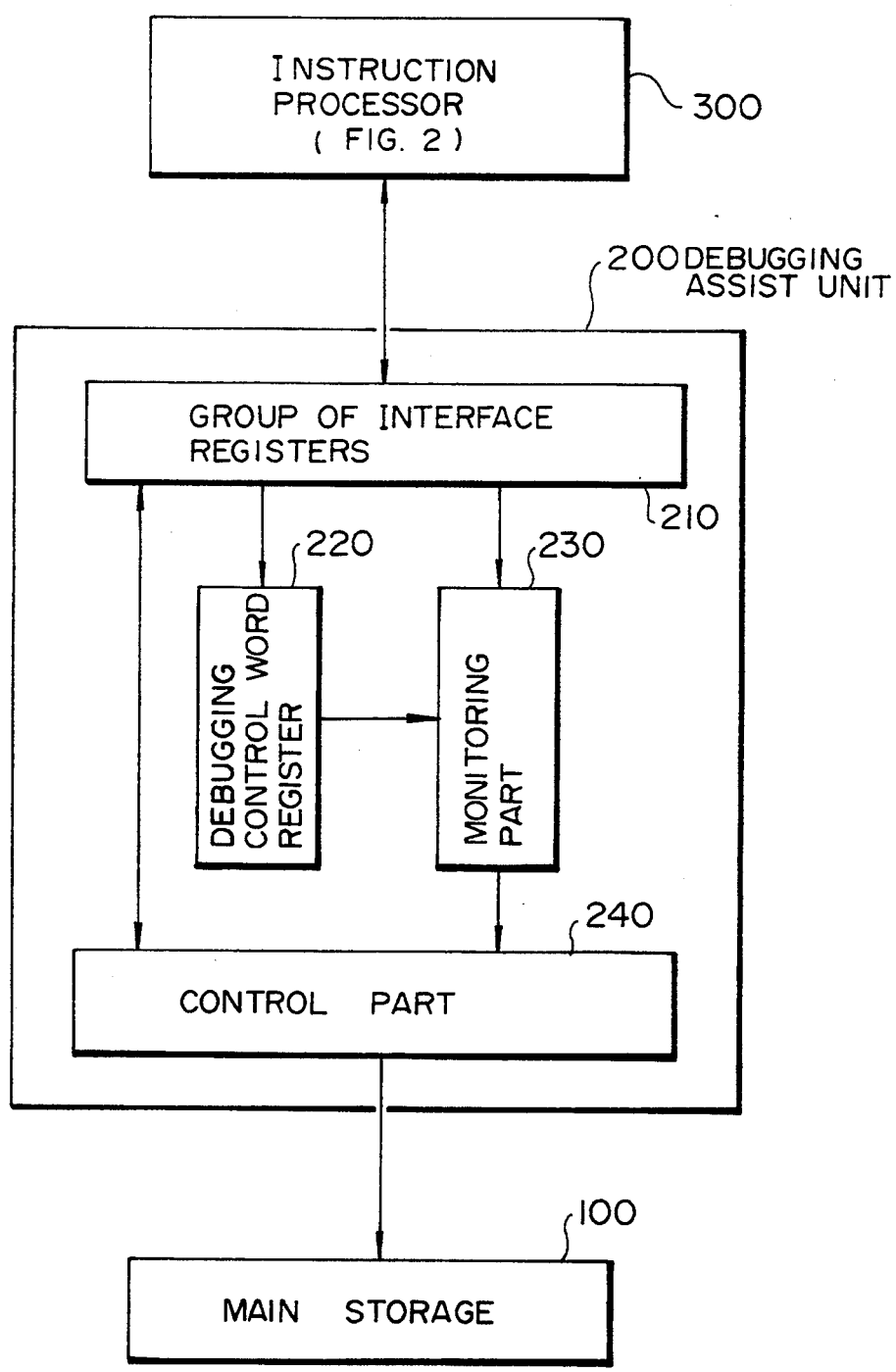
FIG. 4 is a schematic diagram showing a structure of a real computer to which the present invention is applied.

Next, description will be directed to structures of the instruction processor 300 and the debugging assist unit by reference to FIGS. 2 to 4.

(a) Structure of the instruction processor 300

First, a structure of the instruction processor 300 will be described by reference to FIG. 2. The instruction processor 300 is composed of a program status word (also referred to as PSW in abbreviation) 311 for holding a program event record mask (R bits) for controlling the monitoring performed by the debugging assist unit 200 and an address of an instruction to be next executed (this address is also referred to simply as NIA) and others, an instruction fetch circuit 311 for fetching from the main storage 100 an instruction to be next executed or NIA indicated by the program status word PSW 311 from the main storage 100, an instruction register 320 for holding an instruction being executed, an instruction decoder 330 for decoding the instruction code placed in the instruction register 320, and an instruction execution unit 340 for executing the instruction decoded by the instruction decoder 330.

Further, the instruction processor 300 includes a general-purpose register (GR) 350, an interpretative execution mode (IE) register 381 for indicating whether the VM is running or not, an instruction processor debug control word (IP-DCW) register 382 for holding control parameters for the debugging assist unit 200, a parameter load (PL) state register 384 for identifying discriminatively whether or not the value of the IP-DCW register 382 is valid, a twelfth guest control register 385 for holding the value of the twelfth control register of the running VM (i.e. the VM which is running), a twelfth host control register 386 for holding the value of the twelfth control register designated by the VMCP 110, an address translation circuit 360 for making decision as to whether or not the guest trace area 111-$j$ of the running VM is in the page-in state and at the same time determining a corresponding physical address, a load circuit 370 for transferring the value of the IP-DCW register 382 to the debugging assist unit 200, an interception execution part 380 for changing over the control from the VM running state to the VMCP 110, an inverter 399, an AND circuit 397, a trace area select circuit 393, an address addition area select circuit 396 and adders 394 and 395. Operations of the individual circuits or units mentioned above will be described in detail later on.

(b) Structure of the debugging assist unit

As described in JP-A-59-153246 cited hereinbefore, the debugging assist unit 200 is constituted by a group of interface registers 210 serving for interfacing with the instruction processor 300 shown in FIG. 4 and holding the values of registers incorporated in the instruction processor 300, a debug control word register 220 for holding information for monitoring the program events, a monitor part 230 for monitoring the program events which take place in the instruction processor 300 in accordance with control information indicated in the debug control word register 220, and a control part or controller 240 for indicating occurrence of interruption to the instruction processor 300 and storing the trace information in the trace area in response to the detection by the monitoring part 230 of the program event prescribed by the control information held in the debug control word register 220. The debugging assist unit 200 is validated or enabled when the program event recording mask (R bit) 315 of the program status word PSW 311 shown in FIG. 2 is "1", to thereby start the monitoring operation.

Now, operations of the instant embodiment of the invention will be described in detail by classifying as follows:

(1) operation at the start of OS running, (2) monitor starting operation, (3) trace execution operation, (4) operation of executing instruction issued by running OS, and (5) operation involved upon discontinuation of OS running.

(1) Operation at the Start of OS Running

According to the teachings of the invention incarnated in the instant embodiment, the control information for the debugging assist unit 200 is initialized upon starting of the running of an OS in order to allow the running OS to make use of the results of the tracing.

Figure 10:
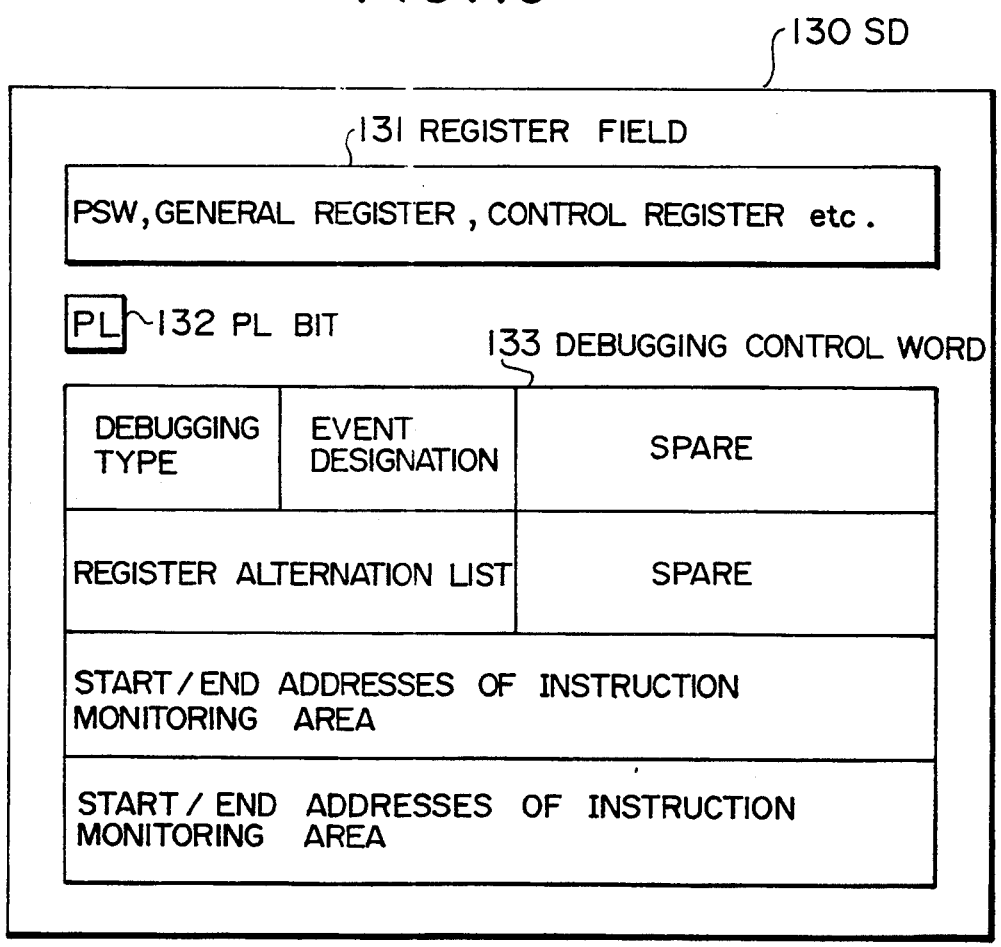
FIG. 10 is a diagram for illustrating a state descriptor.

As is shown in FIG. 10, the state descriptor (SD) 130 which is an operand of the SIE instruction includes the following fields.

(a) Register field 131

This field holds the values for the registers (program status word PSW register, general register, control register and others) which are initialized upon activation of the VM. a twelfth control register resident in this field holds the start VM real address of the guest trace area 111-$i$.

(b) PL bit 132

The PL bit (i.e. parameter load state bit) 132 additionally provided according to the invention indicates the state of a debugging control word 133 (described hereinafter) set at the debugging control word register 220 of the virtual machine VM$_i$ whose state is described by the state descriptor (SD) 130. When the parameter load state bit (i.e. PL bit) 132 is "1", this indicates the state in which the virtual machine VM$_i$ has placed the control parameter in the debugging control word register 220 of the debugging assist unit 200.

(c) Debugging control word 133

The debugging control word 133 is a control parameter which prescribes operation type of the debugging assist unit 200. The debugging control word 133 is composed of fields mentioned below.

(i) Debug type field

This field consists of 8 bits for designating operation types of the debugging assist unit 200. A bit 0 of this debug type field designates an instruction trace type, which a bit 2 designates an interruption type.

(ii) Event designation field

This field consists of 8 bits for designating the events to be monitored by the debugging assist unit.

The event designation bits 0 to 3 each of value "1" serve for indicating that the successful-branching, instruction fetching, main storage alteration (updating) and the general register alteration are program events which are subject to the monitoring.

(iii) Register updating list field

When alteration or updating of the general register (GR) is a program event to be monitored, the bits 0 to 15 of this register updating list field correspond to the general registers 0 to 15, respectively, and when the value of the bit is "1", this indicates that the corresponding general register is subject to be monitored. By way of example, when the event designating bit 3 (adapting of general register) and the bit 0 of the register updating list field are both "1", then the updating or alteration of the general register GR0 is a program even to be monitored.

(iv) Start/end addresses of area to be monitored

These addresses constitute a start address and an end address, respectively, of a range of an instruction word to be monitored. When the successful-branching, instruction fetching or the general register alteration designated as the event to be monitored occurs as a result of execution of an instruction in the area prescribed by this field, the debugging assist unit 200 messages to the program the occurrence of the event through execution of the instruction tracing or interruption in accordance with designation of the debugging type.

(v) Start/end address of region to be updated

These addresses constitute a start address and an end address, respectively, of a region which the main storage alteration even concerns. When the main storage alteration (updating) designated to be monitored occurs in an area prescribed by this field, the debugging assist unit 200 messages to the program the occurrence of the event by executing the instruction tracing or interruption in accordance with designation of the debugging type.

The VMCP 110 sets the physical address of the host trace area 120 of the VMCP in the twelfth host control register 386 in precedence to the running of the operating system $OS_i$.

Further, in precedence to the running of the operating system $OS_i$, the VMCP 110 sets up the state descriptor SD 130-$i$ as follows:

(a) Register field 131

This field designates the initial register values at the time the virtual machine $VM_i$ is started.

(b) PL bit 132

This bit assumes "1" in the state where the operating system $OS_i$ has set a control parameter at the debugging control register 220, while assuming "0" if otherwise. This value is equal to that of the PL bit which makes appearance when the run of a preceding operating system $OS_i$ is discontinued, as will be described hereinafter in the sections "(4) Operation of executing instruction issued by running OS" and "(5) Operation involved in discontinuation of OS running".

(c) Debugging control word 133

This control word designates the value of the debugging control word register 220 designated by the operating system $OS_i$, i.e. the value which the debugging control word 133 has assumed upon preceding occurrence of discontinuation occurrence of interception in the preceding run of the operating system $OS_i$.

Figure 5:
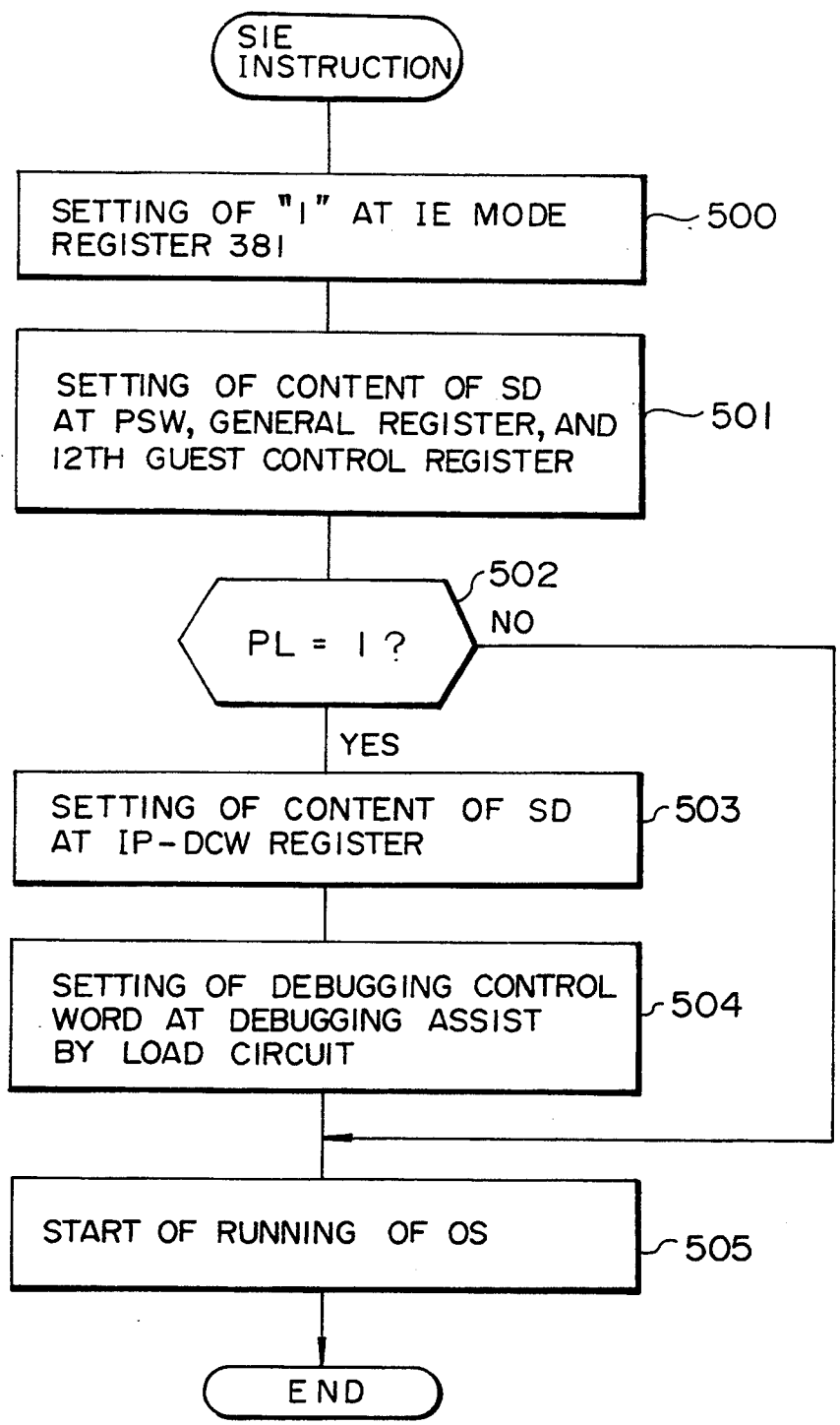
FIG. 5 is a flow chart for illustrating execution of a start interpretive execution (SIE) instruction according to the invention.

When the VMCP 110 issues the SIE instruction with the address of the state descriptor SD 130-$i$ as an operand, the SIE instruction is stored in the instruction register 320. As a result, the instruction decoder 330 commands the instruction execution circuit 340 to execute the SIE instruction. A processing to be subsequently executed by the instruction execution circuit 340 will be described below by reference to FIG. 5 showing a flow chart along with FIG. 2.

(A) At first, "1" (indicating that a VM is running) is set at the IE mode register 381 (step 500).

(B) The program status word PSW, general register and the twelfth control register in the register field 131 of the state descriptor (SD) 130-$i$ are set up as the PSW 310, the general register 350 and the twelfth guest control register 385, while the PL bit 132 is placed in the PL bit register 384 (step 501). Other control registers are also initialized, description of which will however be unnecessary.

(C) Decision is made as to the value of the PL bit 132. When the value is "1", indicating the parameter load state, then the processing proceeds to (D), while proceeding to (F) when the value is "0" (step 502).

(D) The debugging control word 133 of the state descriptor (SD) 130-$i$ is set at the IP-DCW register 382 (step 503).

(E) When the value of the PL bit register 384 is "1", indicating the parameter load state, then the load circuit 370 sets the debugging control word at the debugging control word register 220 incorporated in the debugging assist unit 200 through a data line 1000 (step 504). In this way, so far as the debugging control word 133 is valid, the debugging control word 133 is set at the debugging control word register 220.

(F) Execution of the SIE instruction is terminated whereon the operating system $OS_i$ is allowed to start the running (step 505).

As the result of execution of the SIE instructions, the debugging control word register 220 incorporated in the debugging assist unit 200 for prescribing the program events to be monitored is placed with the monitoring conditions designated by the operating system $OS_i$. Further, the twelfth host control register 386 is placed with the physical address of the host trace area 120 while the twelfth guest control register 385 is placed with the VM real address of the guest trace area 111-$i$, respectively.

Through the procedure described above, the results of tracing during the running of the OS undergo initialization in order to make the results be utilizable by the running OS.

(2) Monitoring Start Operation

The monitoring start operation according to the instant embodiment of the invention is characterized by features mentioned below.

(a) In order that the result of tracing relevant to execution of a program which is being developed under a certain OS be made to be utilizable by the OS, the controller 240 performs monitoring of the program in accordance with the monitoring conditions designated by the OS.

The monitoring operation of the monitoring part 230 incorporated in the debugging assist unit 200 shown in FIG. 4 is carried out only when a monitor indicating signal is sent out onto a signal line 1010 shown in FIG. 2. Sending of the monitor indicating signal onto the signal line 1010 is effectuated when the program event record mask (R bit) 315 of the program status word (PSW) 311 is "1". Accordingly, the monitoring is carried out only when the operating system OS. sets "1" at the program event record mask (R bit) 315 of the program status word (PSW) 311.

After the operating system $OS_i$ has started to run and when the monitor indicating signal is sent out onto the signal line 1010, the monitoring part 230 of the debugging assist unit 200 can monitor occurrence of the program events prescribed by the debugging control word register 220 which holds the debugging control word 133 received by way of the data line 1000. In this manner, the debugging assist unit 200 monitors the program events in accordance with the debugging control word 133 designated by the operating system $OS_i$.

(3) Trace Executing Operation

The trace executing operation of the instant embodiment includes two operations mentioned below.

(a) In order that the running OS can make use of the result of the tracing, the debugging assist unit 200 stores the trace information in the guest trace area 111-$i$ unless the guest trace area 111-$i$ is in the page-in state.

(b) In order to ensure that the trace can be continued even in the case where the guest trace area 111-i of the running operating system OS<sub>i</sub> has been paged out, the debugging assist unit 200 passes the control to the VMCP 110 after storage of the trace information in the host trace area 120 when the guest trace area 111-i is in the page-out state, as a result of which the VMCP 110 stores the trace information at the page of the disk unit 400 where the guest trace area 111-i exists.

When the monitoring part 230 detects the program event prescribed by the debugging control word register 220 incorporated in the debugging assist unit 200 in the course of running of the operating system $OS_i$, the monitoring part 230 sends an activation or enable signal to the controller 240.

Figure 7:
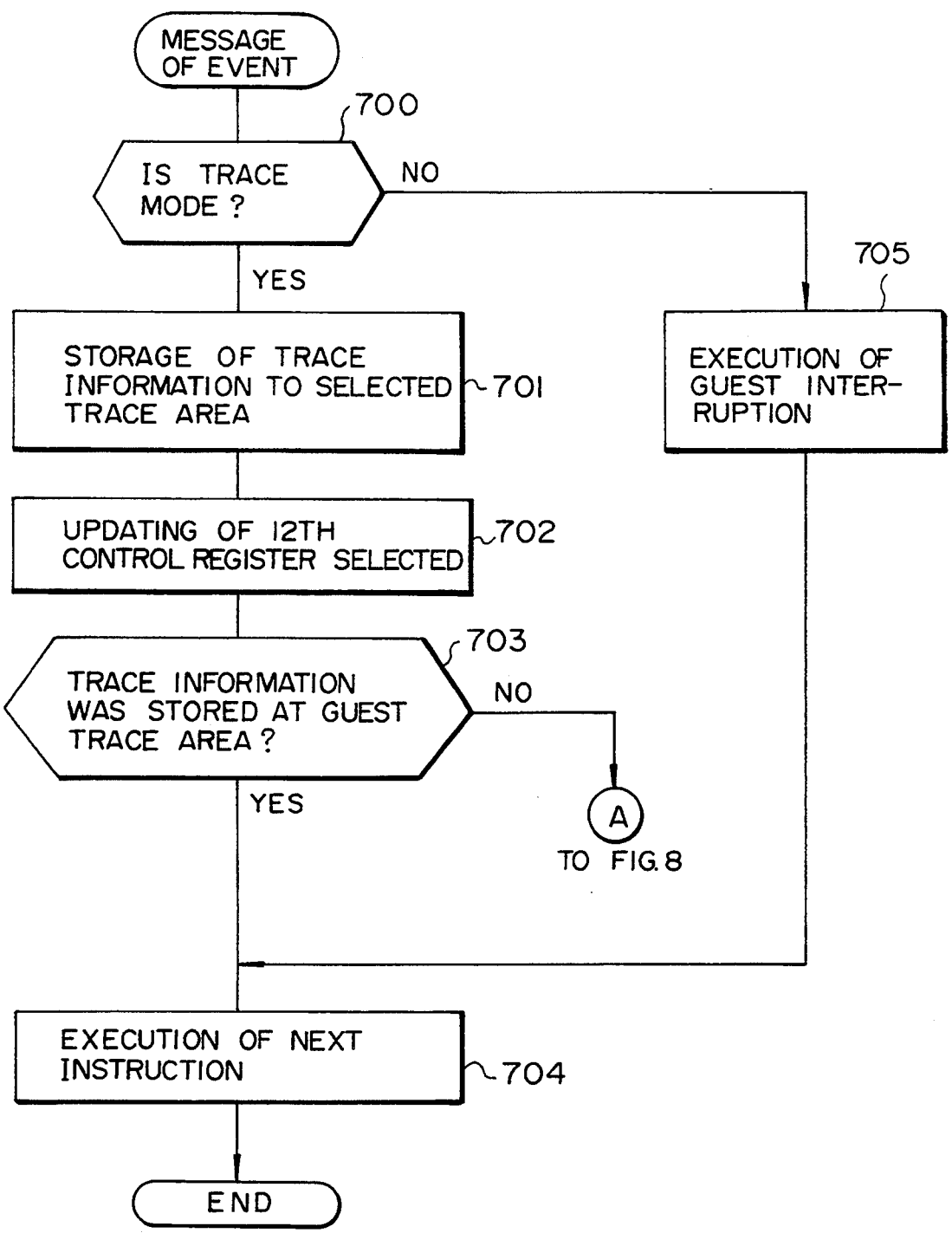
FIG. 7 is a flow chart for illustrating operation performed by the debugging assist unit in the course of running of an OS.

Now, operation of the controller 240 performed upon reception of the activation signal will be described below with the aid of a flow chart shown in FIG. 7.

(A) The controller 240 makes decision as to whether or not the debug type bit 0 (instruction trace type) contained in the debugging control word register 220 is "1" (step 700). When it is "1" (indicating the trace), then the processing proceeds to (B). Further, when the debug type bit 2 (interruption type) in the debugging control word register 220 is "1", interruption to the running OS is executed (step 705), to execute a next instruction (step 704). In this manner, occurrence of the prescribed program event is informed to the operating system $OS_i$ in terms of the interruption.

(B) The controller 240 stores the trace information in the trace area selected through a procedure described below (step 701).

At first, referring to FIGS. 2 and 3, description will be made in what manner the trace area (host trace area 120 or guest trace area 111-i shown in FIG. 1) is selected by the controller 240 for storing the trace information.

FIG. 3 shows in detail a structure of the address translation circuit 360 shown in FIG. 2. Referring to FIG. 3, a host segment table (ST) 113 and a host page table (PT) 114 represent the address translation tables, respectively, prepared by the VMCP 110 for translating the virtual main storage addresses of the running operating system $OS_i$ into has physical addresses. Further, the first host control register 361 holds the origin physical address of the host segment table (ST) 113. On the other hand, the twelfth guest control register 385 holds the current origin address of the guest trace area 111-i. However, since this address is the real address of OS, translation into the physical address is required in order to actually make access thereto. The address translation circuit 360 includes adder 363 and 365, a ST entry hold register 364 for holding a selected entry of the host segment table (ST) 113, a PT entry hold register 366 for holding a selected entry of the host page table (PT) 114, an AND circuit 367, an address register 368 for holding the physical address of the guest trace area 111-i and inverters 369-1 and 369-2.

Operation of the address translation circuit 360 will now be described.

First, the segment field (S) of the twelfth guest control register 385 and the value of the first host control register 361 are added together by the adder 363 to determine the corresponding entry address of the host segment table (ST) 113, whereon the entry is stored in the ST entry hold register 364. This ST entry is composed of a validity bit V1 indicating the entry being valid when the bit is "0", and a page table address portion for holding the origin physical address of the host page table (PT) 114 which corresponds to the address of the guest trace area 111-i.

Subsequently, the page field (P) of the twelfth guest control register 385 and the page table address in the ST entry hold register 364 are added by the adder 365 to determine the corresponding entry address of the host page table (PT) 114, whereon the entry is stored in the PT entry hold register 366. This PT entry is also composed of a validity bit V2 indicating that the entry is valid when the bit V2 is "0" and a page address portion corresponding to the address of the guest trace area 111-i. The page address portion placed in the PT entry hold register 366 is combined with displacement (D) in the twelfth guest control register 385 and stored in the address register 368. On the other hand, the validity bits V1 and V2 are inputted to the inverters 369-1 and 369-2, respectively. Consequently, the output of the AND circuit 367 assumes "1" only when the host segment table (ST) 113 and the host page table (PT) 114 as selected are both valid. Thus, when the output of the AND circuit 367 making appearance on the signal line 1060 is "1", the guest trace area 111-i is in the page-in state wherein, the physical address thereof is stored in the address register 368 to be outputted onto the data line 1070. Further, when the output of the signal line 1060 is "0", this means that the guest trace area 111-i is in the page-out state.

The trace area select circuit 393 shown in FIG. 2 has the inputs supplied, respectively, with the output on the data line 1070 and the value of the twelfth host control register 386 which holds the physical address of the host trace area 111, to thereby output values mentioned below. First, assuming that the output of the AND circuit 397 produced on the signal line 1080 is "0" (i.e. when the guest trace area 111-i is in the page-out state), the trace area select circuit 393 outputs the value of the twelfth host control register 386 onto the data line 1090. On the other hand, when the output signal on the line 1080 is "1" (indicating that the guest trace area 111-i is in the page-in state), the physical address of the guest trace area 111-i inputted via the data line 1070 is outputted onto the data line 1090 by the trace area select circuit 393.

Subsequently, the controller 240 stores the trace information in the area outputted from the trace area select circuit 393.

Figure 9:
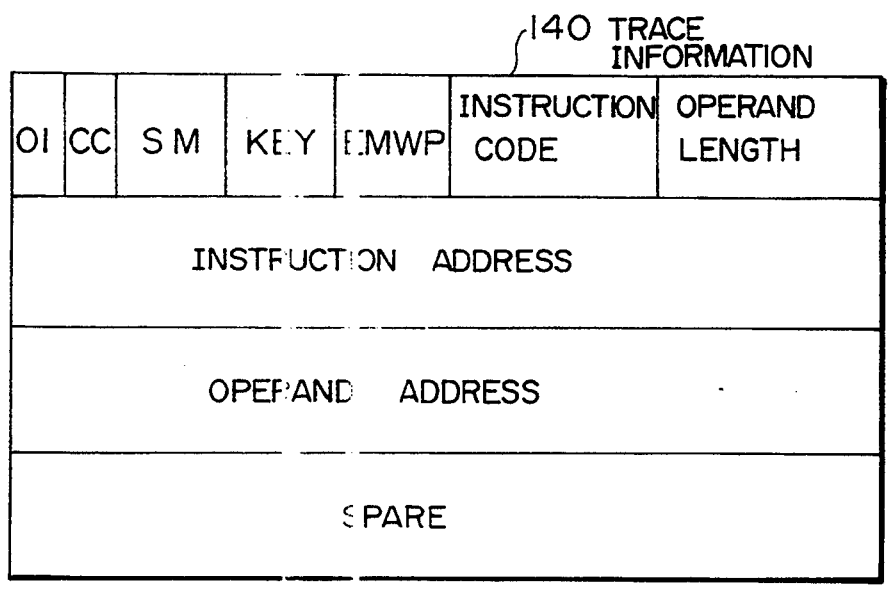
FIG. 9 is a diagram for illustrating trace information.

This trace information is of such a format as illustrated in FIG. 9 and may be composed of, for example, 16 bytes, wherein the first two bits (01) represents a fixed value indicating the start of the trace information, and CC represents a condition code of a current program status word (PSW) before execution of the traced instruction. Further, SM represents a system mask of the current program status word (PSW) before execution of the traced instruction. More specifically, the bit 0 of the system mask SM represents the program event record mask (R bit), the bit 1 is a translation control bit, the bit 2 represents an IO mask, and the bit 3 represents an external mask, wherein all the corresponding bits exist in the program status word (PSW) 311. Further, a symbol KEY represents a PSW key (protection key) for the current program status word (PSW) 311 before execution of the traced instruction. Symbols E, M, P and W represent, respectively, an extension control mode bit, a machine check bit, a wait state bit and a problem state bit (P bit) of the current program status word (PSW) 311 before execution of the traced instruction. An instruction code consists of eight bits constituting a leading half of the instruction code of the traced instruction. Further, "INSTRUCTION ADDRESS" represents an instruction address of the traced instruction. In the case of the instruction tracing due to the main storage alteration (update) event, the operand length and the operand address are stored in the operand length field and the operand address field of the trace information 140, respectively.

Through the procedure described above, the trace information is stored in the selected trace area.

(C) Subsequently, the twelfth control register as selected is updated or altered through a procedure described below (step 702).

After storage of the trace information, the controller 240 sends a trace end signal to the adders 394 and 395 via a signal line 1110. As a result, the adder 394 adds together the value of the twelfth guest control register 385 and the size of the trace information (e.g. of 16 bytes), while the adder 395 adds together the value of the twelfth host control register 386 and the size of the trace information (e.g. of 16 bytes). A trace size register 390 serves for holding the size of the trace information. Subsequently, an address sum area select circuit 396 selects the sum value of the twelfth control register in which the trace information has been stored, as in the case of the trace area select circuit 393, and updates the abovementioned sum value of the control register in which the trace information has been stored (i.e. the twelfth guest control register 385 or the twelfth host control register 386) with the sum value mentioned above. Owing to alteration or updating of the twelfth control register, it is now made possible to write succeeding trace information in succession to the area undergone precedingly the write operation.

(D) The decision is made as to whether the debugging assist unit 200 has traced to the host trace area 120 or not regardless of the debugging assist unit 200 being used by the running operating system OS through a procedure described below.

Possibility of the debugging assist unit 200 having traced to the host trace area 120 notwithstanding of the debugging assist unit 200 being used by the running operating system OS is limited to the case in which the guest trace area 111-$i$ is in the page-out state, in which the output of the inverter 399 is "1" and the trace end signal 1110 is being sent out. Accordingly, it is possible to decide if the debugging assist unit 200 has traced to the host trace area 120 regardless of the debugging assist unit 200 being used by the running operating system OS, by deciding if the output of the AND circuit 397 is "1" or not (step 703).

(i) When the output of the AND circuit 397 is "1", the interception execution part 380 discontinues the running of the virtual machine VM$_i$ and passes the control to the VMCP 110. The discontinuation of the running of the virtual machine VM$_i$ will be described in detail in the section entitled "(5) Operation involved in discontinuation of OS running".

The reason why the running of the virtual machine VM$_i$ is discontinued is explained by the fact that when the guest trace area 111-$i$ of the operating system OSi is in the page-out state, the host trace area 120 of the VMCP 110 is selected. After the discontinuation, the trace information stored in the host trace area 111 is copied by the VMCP 110 to a page of the disk unit 400 at which the guest trace area 111-$i$ of the operating system OSi whose running has been discontinued exists (step 804). In this way, there is stored correct trace information at the guest trace area 111-$i$ of the operating system OSi.

(ii) When the output of the AND circuit 397 is "0", the trace end signal 1110 validates the instruction fetch circuit 310 for thereby causing the latter to generate a next instruction (step 704). In this case, the operating system OSi is allowed to continue to run.

Through the procedure described above, when the running OS designates the instruction trace type as the debug type of the debugging control word register 220, the trace area select circuit 393 outputs the physical address of the guest trace area 111-$i$ as the trace area address. As a result of this, the debugging assist unit 200 stores the trace information at the guest trace area 111-$i$. However, when the guest trace area 111-$i$ is in the page-out state, the trace area select circuit 393 outputs the physical address of the host trace area 120 as the trace area address. Thus, in order to ensure continuation of the trace even when it takes place that the trace area of the running OS is paged out, the intercept execution part 380 transfers control to the VMCP after the debugging assist unit 200 has stored the trace information at the host trace area 120, whereon the VMCP stores the trace information at a page of the disk unit 400 where the guest trace area 111 exists.

(4) Operation of Executing Instruction Issued by Running OS

Figure 6:
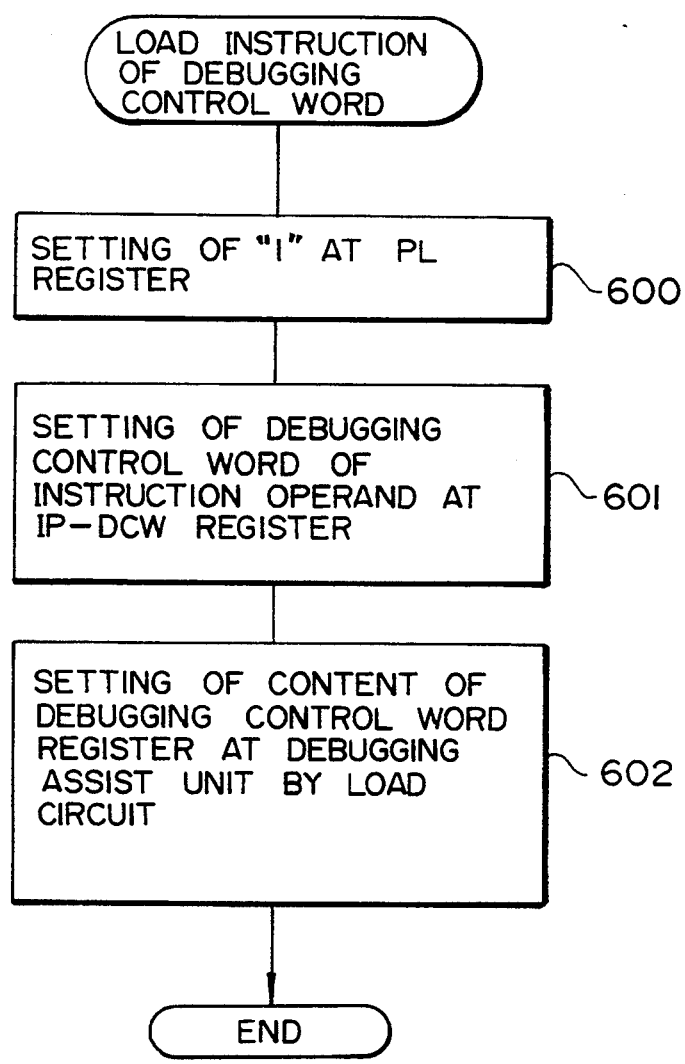
FIG. 6 is a flow chart for illustrating operation for executing a debugging control word load instruction issued by an OS in the course of running thereof according to the invention.

A debugging control word load instruction issued by the running operating system OSi and described in JP-A-59-153246 mentioned hereinbefore is executed by the instruction execution circuit 340 in a manner which will be described below by reference to FIG. 6.

(A) The parameter load state (PL bit) register 384 shown in FIG. 2 is placed with "1" indicating that the control parameters are loaded (step 600).

(B) The debugging control word 133 designated on the virtual main storage 110-$i$ with the debugging control word load instruction is set at the IP-DCW register 382 (step 601).

(C) Subsequently, through same operation as that described hereinbefore in "(1) Operation at the start of OS running", a load circuit 370 transfers the value of the IP-DCW register 382 to the debugging control word register 220 of the debugging assist unit 200 (step 602).

(5) Operation Involved in Discontinuation of OS Running

The instant embodiment of the invention is also characterized in that upon discontinuation of OS running, the value of debugging control word register 220 which represents control information for the debugging assist unit 200 is saved on the main storage with a view to making any running OS utilize the results of the trace performed during OS running not only for a particular OS but for a plurality of OSs.

Figure 8:
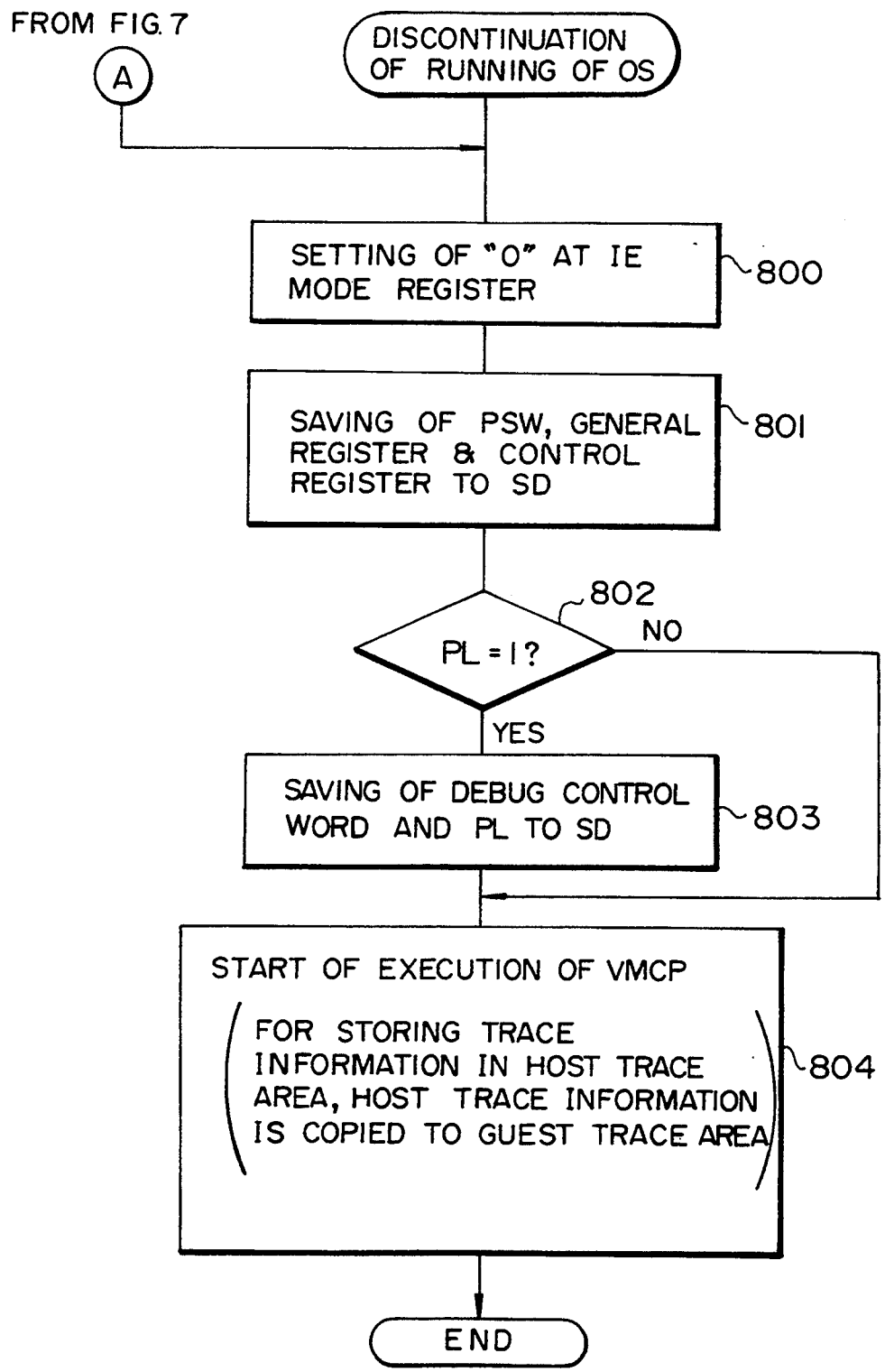
FIG. 8 is a flow chart for illustrating operation for discontinuing the running of an OS.

Upon discontinuation of the run of an operating system OSi, the intercept execution part 380 shown in FIG. 2 saves the twelfth guest control register 385 and the IP-DCW register 382 as well as the load states thereof to the state descriptor (SD) 130-$i$ in a manner which will be described below by reference to FIG. 8.

(A) The IE mode register 381 is placed with "0" (step 800).

(B) Values of the guest control registers including the program status word (PSW) 311, the general register 350 and the twelfth guest control register 385 are saved to a register field 131 (FIG. 10) of the state descriptor (SD) 130-i (FIG. 1) (step 801).

(C) Decision is made as to whether or not the parameter load state (PL bit) register 384 is "1" (indicating that the value of the debugging control word register 220 shown in FIG. 4 is valid. If it is "1", the processing proceeds to (E) while processing to (F) if it is "0" (step 802).

(D) The parameter load state (PL bit) register 384 and the IP-DCW register 382 are saved to the PL bit 132 (FIG. 10) of the state descriptor (SD) 130-i (FIG. 1) and the debugging control word 133 (step 803).

(E) Execution of the VMCP 110 is started (step 804).

In this manner, the value of the debugging control word register 220 can be saved to the debugging control word 133 shown in FIG. 10 only when the OS is loading the debugging control word 133 (FIG. 10) in the debugging control word register 220 shown in FIG. 4. Thus, the unnecessary saving can be evaded, whereby the processing can be accomplished at a high speed. Subsequently, the initial state from which this operating system OSi starts to run can be held at the state descriptor (SD) 130-i.

As will be appreciated from the foregoing description, the result of tracing a running OS by the debugging assist unit can be utilized by OSs according to the teachings of the invention incarnated in the illustrated embodiment. Further, the trace can be continued even when the page of an OS at which the trace information is to be stored by the debugging assist unit is paged out by the VMCP.

Although description has been made on the assumption that the real trace area allocated to the OS is paged out, it goes without saying that the invention can equally be applied to a system in which individual OSs constitute resident parts of the main storage.

Further, although the foregoing description has been made in conjunction with a virtual machine system on which a plurality of OSs can run under the control of a control program, it should be apparent that the invention is never restricted to the above system but can be applied to a system in which a plurality of OSs can be caused to run simultaneously.

The embodiment of the invention described above is directed to a virtual machine system. However, this is by way of example only. The teachings of the invention can be applied to any type computer system in which a plurality of OSs run.

What is claimed is

1. A computer system dedicated to accumulation of trace data which can execute a plurality of operating systems traced during, comprising:
    an instruction processor for executing processings of said operating systems under control of a control program;
    a real main storage including a first area assigned to said control program and having a first trace area for storing trace information and a second area assigned to at least a part of a virtual main storage which is used as a main storage by said operating systems, said virtual main storage including a second trace area for storing trace information;
    external storage means for storing data held by said virtual main storage;
    indicating means for indicating at least one event selected from the group consisting of:
        (a) an event indicating that successful branching has resulted from execution of a branch instruction resident at an area of the virtual main storage designated by a running operating system,
        (b) an event indicating that an instruction resident at an area of the virtual main storage designated by a running operating system has been executed,
        (c) an event indicating that data have been stored at an area of the virtual main storage designated by a running operating system, and
        (d) an event indicating that a general register designated by a running operating system is updated or altered by an instruction resident at an area of the virtual main storage designated by the running operating system; and
    debugging means for detecting execution of a particular program event designated previously by said operating system and for storing trace information in said real main storage based on an address provided from said instruction processor in response to a result of detection;
    wherein said instruction processor comprises:
    a first register for holding an address indicating a location of trace information in said first trace area on said real main storage,
    a second register for holding an address indicating a location of trace information in said second trace area on said virtual main storage used by a running operating system,
    address translation means for translating an address held in said second register to a corresponding address on said real main storage,
    determining means for determining whether said second trace area indicated by an address held in said second register resides in said second area assigned to a running operating system or not, and
    means responsive to a result of determination by said determining means for selecting an address held in said first register in case of negative result and an address provided from said address translation means in case of affirmative result and outputting said selected address to said debugging means as a trace area address.

2. A computer system according to claim 1, wherein said debugging means comprises means for indicating an end of storing said trace information into said real main storage to said instruction processor.

3. A computer system according to claim 1, wherein said instruction processor further comprises:
    means for issuing an interrupt to said control program when an output to said determining means indicates that said second trace area does not reside in said second area; and
    wherein said instruction processor, responsive to said issued interrupt, discontinues said processings of said running operating system, starts said control program, and stores said trace information in said first trace area in said second trace area in said external storage means by use of said started control program.

* * * * *